United States Patent
Sung et al.

(10) Patent No.: US 10,299,145 B1
(45) Date of Patent: May 21, 2019

(54) SYSTEMS AND METHODS FOR MITIGATING INTERFERENCE FROM NEIGHBORS

(71) Applicant: Sprint Spectrum LP, Overland Park, KS (US)

(72) Inventors: Sanghoon Sung, Ashburn, VA (US); Dhaval Mehta, Aldie, VA (US); Udit Thakore, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 138 days.

(21) Appl. No.: 15/343,448

(22) Filed: Nov. 4, 2016

(51) Int. Cl.
  *H04W 24/02* (2009.01)
  *H04W 72/04* (2009.01)
  *H04L 25/08* (2006.01)
  *H04W 72/08* (2009.01)
  *H04L 27/26* (2006.01)

(52) U.S. Cl.
  CPC ............. *H04W 24/02* (2013.01); *H04L 25/08* (2013.01); *H04L 27/2602* (2013.01); *H04W 72/0446* (2013.01); *H04W 72/082* (2013.01)

(58) Field of Classification Search
  None
  See application file for complete search history.

(56) References Cited

U.S. PATENT DOCUMENTS

| | | | |
|---|---|---|---|
| 8,068,786 B2 | 11/2011 | Pawar et al. | |
| 8,504,091 B2 | 8/2013 | Palanki et al. | |
| 8,942,192 B2 * | 1/2015 | Damnjanovic | H04W 72/04 370/329 |
| 9,313,004 B2 * | 4/2016 | Yanover | H04L 5/0053 |
| 2012/0236736 A1 * | 9/2012 | Frank | H04W 24/04 370/252 |
| 2012/0307808 A1 * | 12/2012 | Song | H04W 36/0055 370/336 |
| 2013/0005269 A1 | 1/2013 | Lindoff et al. | |
| 2013/0107798 A1 * | 5/2013 | Gao | H04W 72/1226 370/328 |
| 2013/0155967 A1 | 6/2013 | Kang et al. | |
| 2013/0163529 A1 * | 6/2013 | Chen | H04W 72/082 370/329 |
| 2013/0279350 A1 * | 10/2013 | Erickson | H04W 24/08 370/252 |
| 2013/0329612 A1 * | 12/2013 | Seo | H04J 11/0056 370/280 |
| 2014/0119332 A1 * | 5/2014 | Kim | H04W 52/243 370/330 |
| 2014/0119334 A1 * | 5/2014 | Kazmi | H04W 24/10 370/330 |

(Continued)

*Primary Examiner* — Candal Elpenord

(57) ABSTRACT

Systems and methods are described for mitigating interference from neighbors. Interference may be monitored at a first access node, wherein the monitoring includes detecting an interference pattern over at least two monitored subframes. The interference pattern may be analyzed to identify one or more interference sources, wherein a first interference pattern indicates interference caused by a neighboring access node and a second interference pattern indicates interference caused by one or more wireless devices communicating with a neighboring access node. The identified interference sources may be instructed to adjust transmissions based on the monitored interference.

10 Claims, 14 Drawing Sheets

(56) References Cited

U.S. PATENT DOCUMENTS

| | | | |
|---|---|---|---|
| 2014/0211734 A1* | 7/2014 | Seo | H04J 11/0056 370/329 |
| 2015/0016348 A1* | 1/2015 | Cimpu | H04W 72/082 370/329 |
| 2015/0029907 A1* | 1/2015 | Cucala Garcia | H04L 5/0073 370/278 |
| 2015/0139018 A1* | 5/2015 | Dinan | H04B 7/2656 370/252 |
| 2017/0111926 A1* | 4/2017 | Madan | H04W 72/1273 |

* cited by examiner

SYSTEMS AND METHODS FOR MITIGATING INTERFERENCE FROM NEIGHBORS

TECHNICAL BACKGROUND

Telecommunication systems, such as cellular networks or other wireless networks, include various access points to gain access to the network. For example, a plurality of access node may be located throughout a geographic area in order to provide wireless services over the area. A plurality of wireless devices may further be in communication with these access nodes, and a multitude of wireless device and access node transmissions may occur in the area. These transmissions may cause interference issues that degrade the efficiency of the system. Accordingly, a system that effectively mitigates interference caused by neighbor transmission devices may be able to provide a high quality service to users of the system.

OVERVIEW

Systems and methods are described for mitigating interference from neighbors. Interference may be monitored at a first access node, wherein the monitoring includes detecting an interference pattern over at least two monitored subframes. The interference pattern may be analyzed to identify one or more interference sources, wherein a first interference pattern indicates interference caused by a neighboring access node and a second interference pattern indicates interference caused by one or more wireless devices communicating with a neighboring access node. The identified interference sources may be instructed to adjust transmissions based on the monitored interference.

In an embodiment, one or more interfering access nodes may be identified. Interference caused by a neighboring access node may be detected at a first access node. Each of a group of access nodes may be instructed to modulate transmissions using one of a subset of mathematical sequences, wherein the subset of sequences is received at the first access node. Interference signals received at the first access node may be monitored, wherein at least one partial orthogonal frequency division multiplexing (OFDM) symbols of the interference signals is received. The partially received OFDM symbol may be demodulated such that an access node that transmitted the partially received symbol is identified based on the subset of sequences. The identified access node may be instructed to adjust transmissions.

DETAILED DESCRIPTION

Systems and methods are described for mitigating interference from neighbors. For example, a first access node may communicate with wireless devices over wireless communication. In a wireless system, neighboring access nodes may also communicate with neighboring wireless devices over wireless communication. Transmissions between neighboring access nodes and neighboring wireless devices may interfere with wireless communication between the first access node and wireless devices in communication with the first access node.

In an embodiment, interference received at the first access node may be monitored over at least two subframes. The interference pattern may then be analyzed to determine a source for the interference. For example, a first interference pattern may indicate interference from a neighboring access node and a second interference pattern may indicate interference caused by neighboring wireless devices. In an embodiment, the received interference signals may include a partially received symbol, and the partially received symbol may be demodulated such that the access node that transmitted the signal may be identified. The identified interference sources may be then instructed to adjust transmissions based on the monitored interference. Accordingly, interference at a first access node caused by neighbors may be mitigated.

Figure 1:
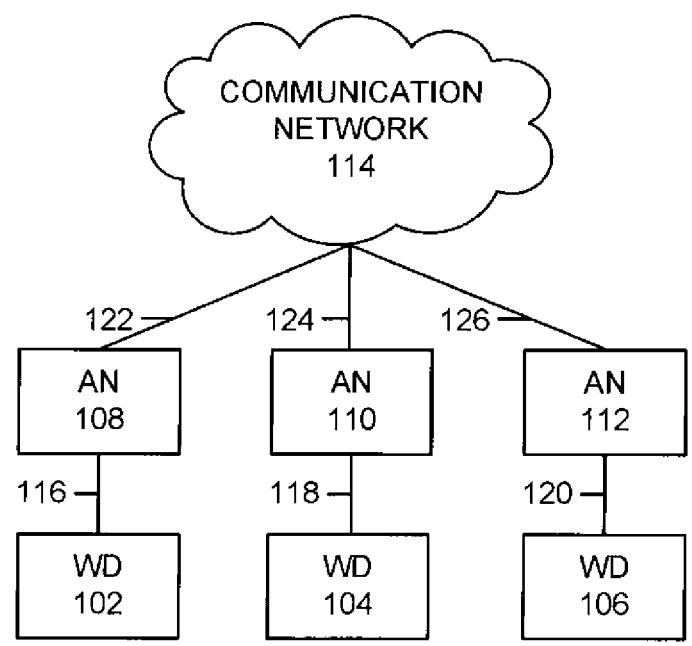
FIG. 1 illustrates an exemplary communication system to mitigate interference from neighbors.

FIG. 1 illustrates an exemplary communication system 100 to perform beamforming during carrier aggregation comprising wireless devices 102, 104, and 106, access node 108, 110, and 112, communication network 114, and communication links 116, 118, 120, 122, 124, and 126. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 108, 110, 112, and communication network 114 which are omitted for clarity, including additional processing nodes, routers, gateways, and physical and/or wireless data links for carrying data among the various network elements.

Wireless devices 102, 104, and 106 can be any device configured to communicate over communication system 100 using a wireless communication link. For example, wireless devices 102, 104, and 106 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each access node, any number of wireless devices can be implemented.

Access nodes 108, 110, and 112 are a network node capable of providing wireless communication to wireless devices 102, 104, and 106, and can be, for example, a base transceiver station, a radio base station, and an eNodeB device. Access nodes 108, 110, and 112 may communicate with communication network 114 over communication links 122, 124, and 126 respectively, and with one another. The plurality of access nodes and/or small cells can be associated with different networks and can support different communication protocols and radio access technologies.

Communication network 114 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 114 can be capable of carrying voice information and other information, for example, to support communication by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 114 may also comprise a wireless network, including base stations, wireless communication nodes, telephony switches, internet routers, network gateways, computer systems, communication links, or some other type of communication equipment, and combinations thereof.

Communication links 116, 118, 120, 122, 124, and 126, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access nodes 108, 110, and 112 may establish communication with wireless devices 102, 104, and 106 such that the access nodes provide the wireless devices access to a communication network (e.g., communication network 114). Each access node may include a signal area, or an area around the access node where a wireless device may detect wireless signals transmitted from the access node at a signal level above a threshold.

In an embodiment, system 100 may use a plurality of carriers in order to provide wireless communication services. A plurality of carriers that comprise bandwidth for wireless communication (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 100 may implement a time division duplexing (TDD) communication scheme. For example, in a TDD system, a frame may comprise a number of subframes (e.g. Transmission Time Intervals, TTIs) that include a mix of uplink subframes and downlink subframes.

In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. In an embodiment, a frame structure may comprise uplink subframes, downlink subframes and/or special subframes, where each frame structure may comprise a different mix of subframes.

In an embodiment, access node 108 may experience interference based on wireless transmissions between neighboring access nodes 110 and 112 and neighboring wireless devices (e.g., wireless device 104 and 106). For example, transmissions from neighboring access nodes 110 and 112 may cause time of flight (TOF) interference at access nod 108. In an embodiment, system 100 may implement a time division duplexing (TDD) communication scheme. Access node 108 may be a distance away from access nodes 110 and/or 112 (e.g., approximately 20-40 miles away). During a downlink subframe, access nodes 110 and/or 112 may transmit downlink transmission, and due to the distance between the access nodes, access node 108 may experience interference from these downlink transmissions during an uplink subframe. In another example, transmissions from neighboring wireless devices in communication with neighboring access nodes 110 and/or 112 may cause interference at access node 108. Accordingly, a system that effectively mitigates interference from neighbors may provide enhanced service to users of the system.

Figure 2:
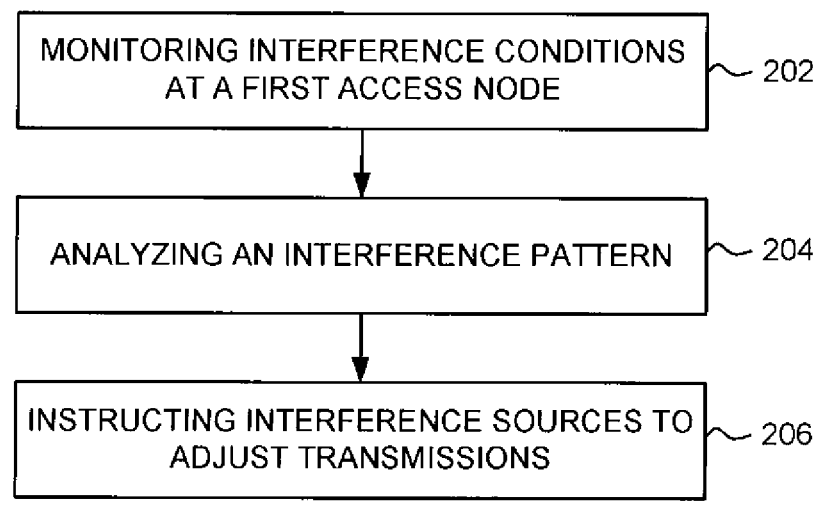
FIG. 2 illustrates an exemplary method for mitigating interference from neighbors.

FIG. 2 illustrates an exemplary method for mitigating interference from neighbors. The method will be discussed with reference to the exemplary communication system 100 illustrated in FIG. 1, however, the method can be implemented with any suitable communication system.

Referring to FIG. 2, at step 202, interference may be monitored at a first access node, wherein the monitoring includes detecting an interference pattern over at least two monitored subframes. For example, access node 108 may implement a TDD communication scheme and may further schedule two subframes, over which the access node monitors interference experienced at the access node. The interference may be caused by transmissions from neighboring access node 110 and 112 and/or transmissions from neighboring wireless devices 104 and 106.

At step 204, the interference pattern may be analyzed to identify one or more interference sources. For example, the interference experienced at access node 108 over the monitored two subframes may be analyzed. Based on the analysis, a first interference pattern may indicate interference caused by a neighboring access node (e.g., access node 110 and 112) and a second interference pattern indicates interference caused by one or more wireless devices communicating with a neighboring access node (e.g., wireless devices 104 and 106).

At step 206, the identified interference sources may be instructed to adjust transmissions based on the monitored interference. For example, based on the analyzed interference experienced at access node 108, one or more interference sources may be identified. When neighboring wireless devices are determined to be causing interference, the frequency bands that experienced interference (e.g., subcarriers) may be used to identify potential interfering wireless devices, and the identified wireless devices may be instructed to reduce transmission power. When access nodes are determined to be causing interference, one or more access nodes may be identified as interference sources, and the one or more access nodes may be instructed to reduce transmission power and/or adjust transmission scheduling.

Figure 3:
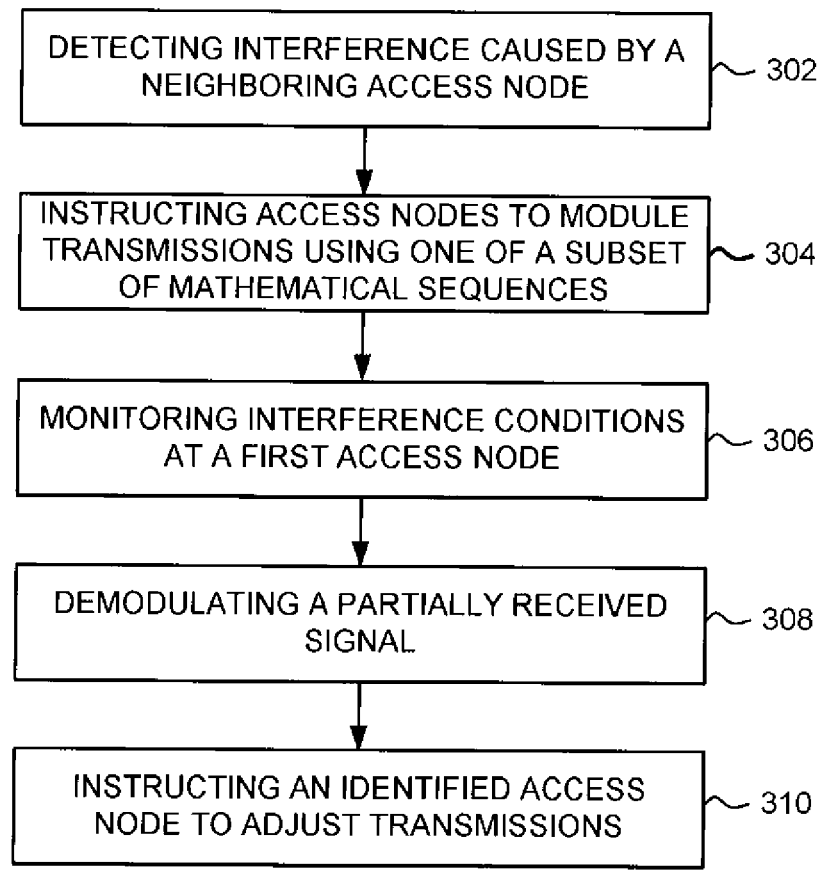
FIG. 3 illustrates another exemplary method for mitigating interference from neighbors.

FIG. 3 illustrates an exemplary method for mitigating interference from neighbors. The method will be discussed with reference to the exemplary communication system 100 illustrated in FIG. 1, however, the method can be implemented with any suitable communication system.

Referring to FIG. 3, at step 302, interference caused by a neighboring access node may be detected at a first access node. For example, TOF interference may be detected at access node 108 caused by a neighboring access node (e.g., access node 110 and/or access node 112).

At step 304, each of a group of access nodes may be instructed to modulate transmissions using one of a subset of mathematical sequences, wherein the subset of sequences is received at the first access node. For example, a group of neighboring access nodes (e.g., access nodes 110 and 112) may be instructed to modulate transmissions using one of a subset of mathematical sequences (e.g., Zadoff Chu sequences or sequences comprising multiple Zadoff Chu sequences). In an embodiment, the group of neighboring access nodes may be instructed to modulate a portion of transmissions (e.g., downlink pilot signals, transmission over particular subframes, a combination of these, or any other suitable portion of transmissions). Access node 108 may also receive the subset of mathematical sequences.

At step 306, interference signals received at the first access node may be monitored, wherein at least one partial orthogonal frequency division multiplexing (OFDM) symbols of the interference signals is received. For example, access node 108 may experience TOF interference from one or more of access nodes 110 and 112. Transmissions from the interfering access node(s) may include a plurality of OFDM symbols, but due to the nature of TOF interference, only a partial symbol may be received at access node 108 as interference.

At step 308, the partially received OFDM symbol may be demodulated such that an access node that transmitted the partially received symbol is identified based on the subset of sequences. For example, the partially received OFDM symbol may be received at access node 108, and it may be demodulated. The mathematical sequence used to modulate the partially received symbol may be determined based on the demodulation and the previously received subset of sequences. The access node that modulated the partially received symbol may then be identified via the determined mathematical sequences.

At step 310, the identified access node may be instructed to adjust transmissions. For example, the identified access node (e.g., one of access nodes 110 and 112) may be instructed to reduce transmission power and/or adjust transmission scheduling.

Figure 4:
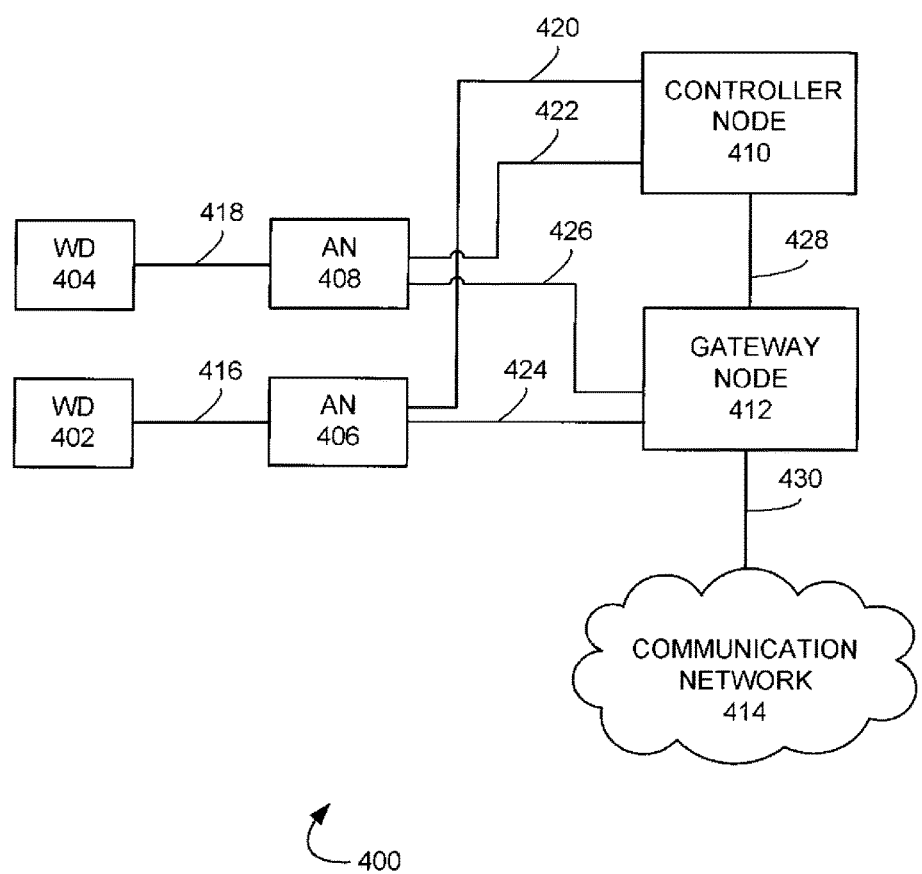
FIG. 4 illustrates another exemplary system to mitigate interference from neighbors.

FIG. 4 illustrates another exemplary communication system 400 to mitigate interference from neighbors. Communication system 400 may comprise wireless devices 402 and 404, access node 406, controller node 408, gateway node 410, communication network 412, and communication links 414, 416, 418, 420, 422, and 424. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 is a network node capable of providing wireless communication to wireless devices 402 and 404, and can be, for example, a base transceiver station, a radio base station, or an eNodeB device. In an embodiment, access node 406 can comprise a serving access node for wireless device 402 and 404. Access node 406 may communicate with controller node 408 over communication link 418, and with gateway node 410 over communication link 420.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 414 can provide instructions to access node 406 related to channel selection in communications with wireless devices 402 and 404. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, and 424 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406, controller node 408, gateway node 410, and communication network 412 which are omitted for clarity, including additional processing nodes, routers, gateways, and physical and/or wireless data links for carrying data among the various network elements. In an embodiment, any of controller node 408, gateway node 410, and one or more modules of access node 406 may perform all or parts of the methods of FIGS. 2, 3 6, and 8.

Figure 5:
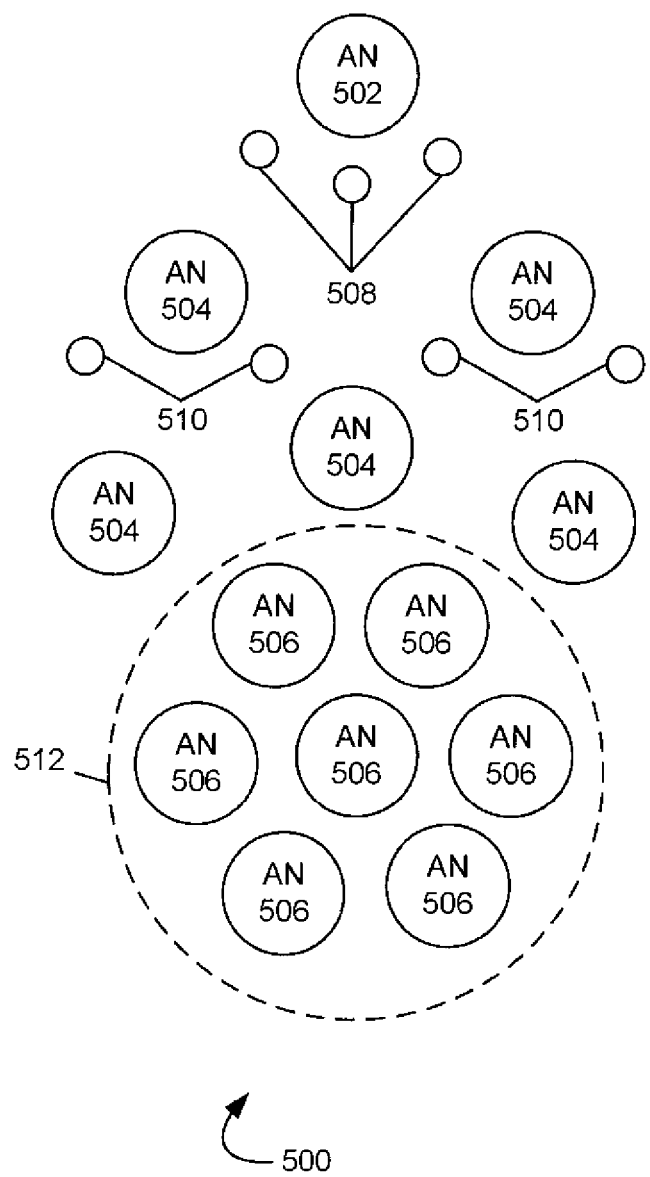
FIG. 5 illustrates another exemplary system to mitigate interference from neighbors.

FIG. 5 illustrates an exemplary system for mitigating interference from neighbors. System 500 may comprise access nodes 502, 504, and 506, wireless devices 508 and 510, and geographic area 512. Access nodes 502, 504, and 506 may be similar to access nodes 406. Wireless devices 508 and 510 may be similar to wireless devices 402. Access nodes 502, 504, and 506 may each be part of the same communication network (e.g., communication network 414) or may be part of a plurality of communication networks.

In operation, access node 502 may establish communication with wireless devices 508 such that the access node provides the wireless devices access to a communication network (e.g., communication network 414). Wireless devices 510 may each similarly comprise a serving access node (e.g., one of access nodes 504) or may be in communication with some other communication network (not depicted). Each access node may include a signal area, or an area around the access node where a wireless device may detect wireless signals transmitted from the access node at a signal level above a threshold.

In an embodiment, system 500 may use a plurality of carriers in order to provide wireless communication services. A plurality of carriers that comprise bandwidth for wireless communication (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 500 may implement a time division duplexing (TDD) communication scheme. For example, in a TDD system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. In an embodiment, a frame structure may comprise uplink subframes, downlink subframes and/or special subframes, where each frame structure may comprise a different mix of subframes.

In an embodiment, access node 502 may experience interference based on wireless transmissions between neighboring access nodes 504 and 506 and neighboring wireless devices (e.g., wireless devices 510). For example, transmissions from neighboring access nodes 504 and/or 506 may cause time of flight (TOF) interference at access node 502. In an embodiment, system 500 may implement a time division duplexing (TDD) communication scheme. In an example, access node 502 may be a distance away from access nodes 506 (e.g., approximately 20-40 miles away). During a downlink subframe, access nodes 506 may transmit downlink transmissions, and due to the distance between the access nodes, access node 502 may experience interference from these downlink transmissions during an uplink subframe. In another example, transmissions from neighboring wireless devices (e.g., wireless devices 510) in communication with neighboring access nodes 504 and/or 506 may cause interference at access node 502 (e.g., during an uplink subframe). Accordingly, a system that effectively mitigates interference from neighbors may provide enhanced service to users of the system.

Figure 6:
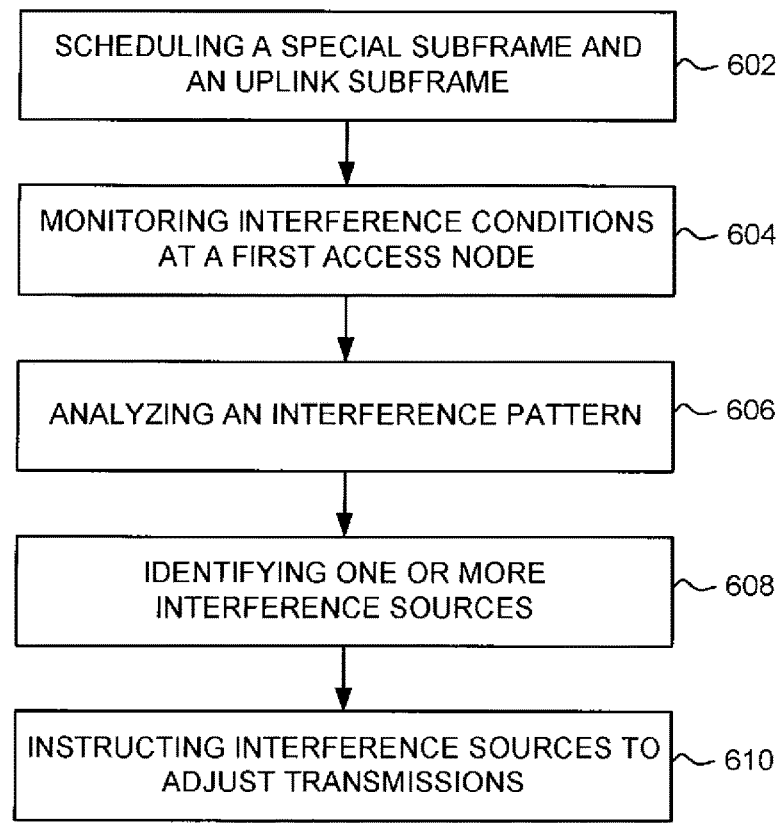
FIG. 6 illustrates another exemplary method for mitigating interference from neighbors.

FIG. 6 illustrates an exemplary method for mitigating interference from neighbors. The method will be discussed with reference to the exemplary communication system 500 illustrated in FIG. 5, however, the method can be implemented with any suitable communication system.

Referring to FIG. 6, at step 602, a special subframe and an uplink subframe may be scheduled at a first access node. For example, access node 502 may implement a TDD communication scheme that includes one or more frame structures. The frame structure selected for communication between access node 502 and wireless devices (e.g., wireless devices 508) may include a sequence of subframes comprising a special subframe followed by an uplink subframe.

In an embodiment, a special subframe may include a downlink pilot time slot (DwPTS), a guard period (GP), and an uplink pilot time slot (UpPTS). In some embodiment, the DwPTS may be treated similar to a shortened downlinks subframe, and thus signals over this period may contain reference symbols. Signals over the DwPTS also may contain synchronization signals used to synchronize downlink communication. In some embodiment, the signals over the UpPTS may include a sounding reference signal or random access (RACH) transmission. The UpPTS may facilitate uplink synchronization between an access node and wireless device. The guard period may comprise unused wireless resources that mitigate interference between uplink and downlink signals. For example, a special subframe may be used to transition from a downlink subframe to an uplink subframe (or vis versa) in an implemented frame structure.

In some embodiments, the length of each of the DwPTS, GP, and UpPTS may vary based on the particular configuration for the wireless network. For example, where a special subframe may comprises 1 ms, the length of the DwPTS may comprise anywhere from 3 OFDM symbols to 11 OFDM symbols, the length of the GP may comprise anywhere from 1 OFDM symbol to 10 OFDM symbols, and the length of the UpPTS may comprise 1, 2 or more OFDM symbols. Any other suitable lengths for the DwPTS, GP, and UpPTS may be implemented as would be recognized by one of ordinary skill in the art. In an embodiment, suitable lengths for each of the DwPTS, GP, and UpPTS may be selected for the special subframe based on a configuration for the wireless network comprising access node 502.

At step 604, interference may be monitored at the first access node, wherein the monitoring includes detecting an interference pattern over at least two monitored subframes. For example, interference may be monitored at access node 502 over the scheduled special subframe and uplink subframe. The interference may be caused by transmissions from neighboring access nodes 504 and 506 and/or transmissions from neighboring wireless devices 510.

At step 606, the interference pattern may be analyzed to identify one or more interference sources. For example, the interference experienced at access node 502 over the monitored two subframes (e.g., a special subframe followed by an uplink subframe) may be analyzed. Based on the analysis, a first interference pattern may indicate interference caused by a neighboring access node (e.g., access nodes 504 and/or 506) and a second interference pattern indicates interference caused by one or more wireless devices communicating with a neighboring access node (e.g., wireless devices 510).

Figure 7A:
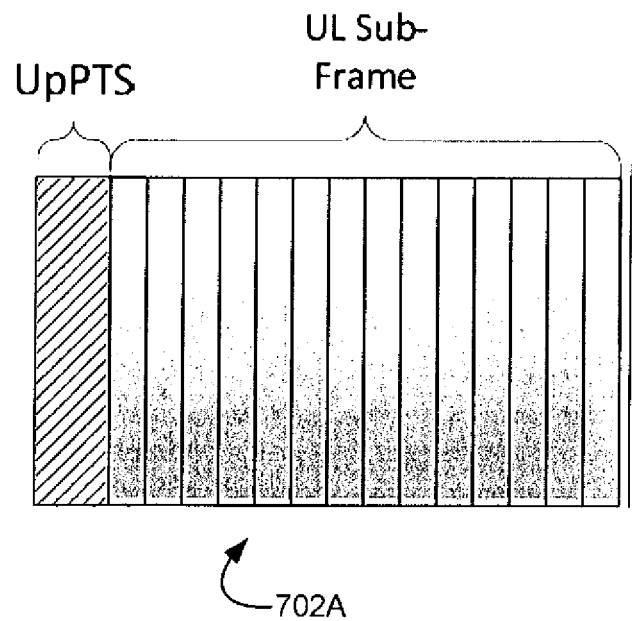
FIGS. 7A-7B illustrate exemplary interference patterns based on interference caused by neighbors.
Figure 7A:
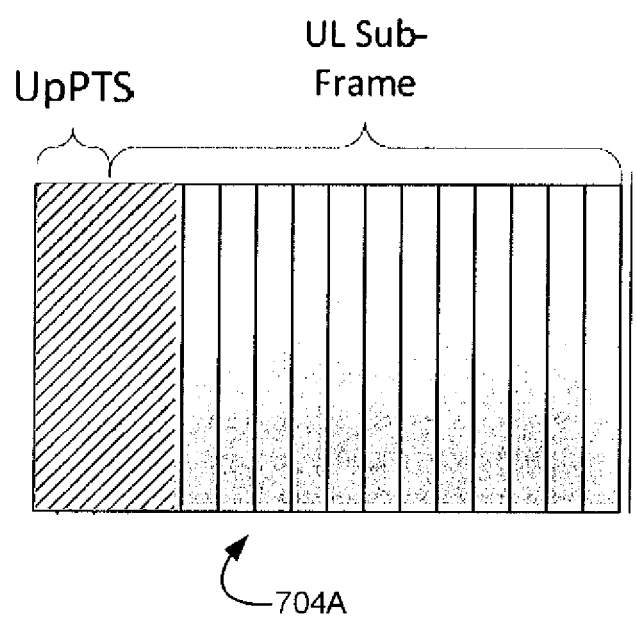
Figure 7B:
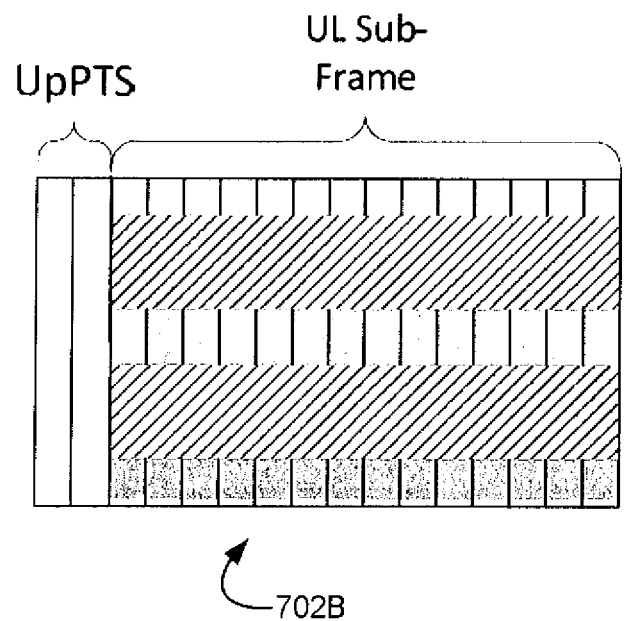
Figure 7B:
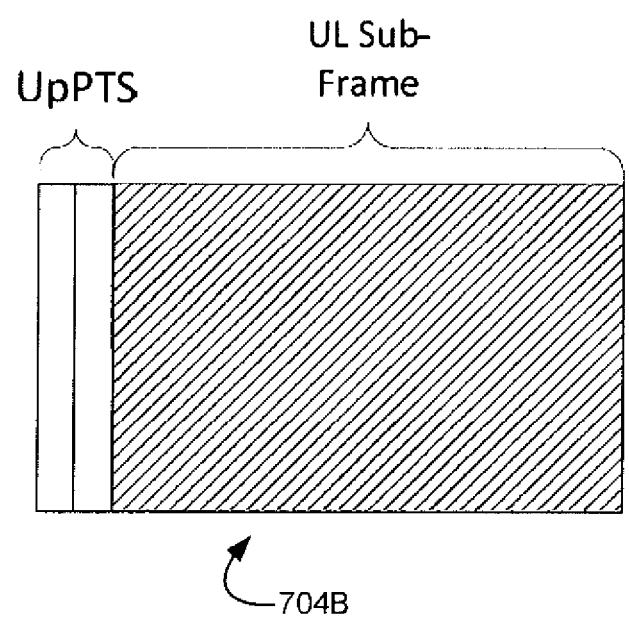

FIGS. 7A and 7B illustrate interference patterns over the monitored two subframes. In the illustrated examples, the interference pattern is monitored over the UpPTS portion of the special subframe and the following uplink subframe. Any other suitable monitoring may be implemented. FIG. 7A may illustrate interference patterns indicating that the interference source is an access node. Interference pattern 702A displays interference experienced at access node 502 over the UpPTS portion of the special subframe. Similarly, interference pattern 704A displays interference experienced at access node 502 over the UpPTS portion of the special subframe and a limited portion of the subsequent uplink subframe. In an embodiment, the limited portion may comprise a portion less than a threshold duration of the uplink subframe or may comprise an energy level for the received interference during the uplink subframe that is less than a threshold energy.

FIG. 7B may illustrate interference patterns indicating that the interference source is one or more wireless devices communicating with neighboring access nodes. Interference pattern 702B displays interference experienced at access node 502 over the uplink subframe, where the interference is only experienced on a subset of frequency bands used to communicate with wireless devices. Similarly, interference pattern 704B displays interference experienced at access node 502 over the uplink subframe, where the interference comprises wideband interference across the frequency bands used to communicate with wireless devices. In an embodiment, interference experienced over both the UpPTS portion of the special subframe and the subsequent uplink subframe (e.g., wideband interference or interference of a subset of frequency bands) may indicate a plurality of interference sources (e.g., access nodes and wireless devices).

In an embodiment, it is determined that interference was experienced at access node 502 over the UpPTS portion of the special subframe, the interference may be identified as Time of Flight (TOF) interference caused by an access node. When it is determined that interference was experienced at access node 502 over the uplink subframe, the interference may be identified as interference caused by wireless devices (e.g., wireless devices 510) communicating with neighboring access nodes (e.g., access nodes 504). When it is determined that interference was experienced at access node 502 over the UpPTS portion of the special subframe and the uplink subframe (e.g., at least a threshold duration of the uplink subframe), the interference may be identified as Time of Flight (TOF) interference caused by an access node and interference caused by wireless devices communicating with neighboring access nodes.

At step 608, one or more interference sources may be identified based on the analysis of the interference patterns. For example, one or more of access nodes 504 and 506 may be identified as interference sources, and/or a plurality of wireless devices 510 communicating with neighboring access nodes may be identified as the interference sources.

In an embodiment where it is determined that the interference source comprises wireless devices, access node 502 may perform additional monitoring. For example access node 502 may monitor and decode the physical uplink shared channel (PUSCH) during a subset of subframes while communicating with wireless devices 508. Based on the monitored and decoded PUSCH, particular subframes and/or frequency bands may be identified as victims of interference. The communication schedules of access nodes proximate to access node 502 (e.g., access node 504) may be analyzed to determine particular wireless devices that correspond to the interference experienced at access node 502 on the victim subframes and/or frequency bands.

In an embodiment where it is determined that the interference source comprises an access node (e.g., TOF interference), additional steps may be taken to identify the particular interfering access nodes. Access node 502 may store the timestamps for the interfering signals (e.g., during the UpPTS portion of the special subframe and the uplink subframe) and may also store the end timestamp for the DwPTS portion of the special subframe. Based on the detected interference, an interferer distance range may be calculated, where the value of the range is bound by a calculated guard period distance (GPD) and a calculated threshold distance (TH_Dist). The threshold distance may be calculated using: TH_Dist=(UL_Int_ET−DwPTS_ET−Time_Off)*(C1). The threshold distance (TH_Dist) may be measured in miles. An end time for the uplink interference (UL_Int_ET), end time for the DwPTS (DwPTS_ET), and UE_time_offset (Time_Off) may be measured in microseconds. C1 may comprise a first constant ratio, such as 300/1600, or any other suitable constant.

A guard period distance may be calculated using: GPD=((GPS*C2)−Time_Off)*C1. The guard period distance (GPD) may be measured in miles, the guard period symbols (GPS) may be measured in a number of symbols, and UE_time_offset (Time_Off) may be measured in microseconds. C1 may comprise the first constant ratio, such as 300/1600, or any other suitable constant. C2 may comprise a second constant of time, such as 71.3542 microsecond, or any other suitable constant. In an embodiment, C1, C2, and Time_Off may be based on symbol length (e.g., OFDM symbol) for the wireless communication and cyclic prefix length of a symbol. For instance, these values may be derived with reference to one or more wireless communications standards, such as LTE and 3GPP. The number of guard period symbols may be selected for the special subframe, as disclosed herein. In an embodiment, the interferer distance range (Int_Range) may be evaluated based on the inequality: GPD<Int_Range<TH_Dist.

In an embodiment, based on the interferer distance range, a subset of access nodes may be identified as potential interferes. For example access nodes 506 within geographic region 512 may be within the calculated interferer distance range, and accordingly access nodes 506 may be identified as potential interferers. In order to identify which of the potential interferers is causing the interference at access node 502, each may be assigned a unique zadoff chu sequence for modulation and may be further instructed to implement the particular zadoff chu sequence over a predetermined duration. In this example, seven potential interferers are identified, and accordingly seven unique zadoff chu sequences are assigned to each of access nodes 506.

Zadoff Chu sequences comprise complex mathematically sequences that, when applied to wireless signals, provide propagation and identification advantages. For example, wireless systems that apply zadoff chu sequences to wireless transmissions may benefit from cross-correlation properties that reduce signal interference. In addition, uniquely assigned zadoff chu sequences for transmitting devices may allow for the source of a wireless transmission to be identified based on the received and demodulated signal.

In the described embodiment, access node 502 may be transmitted or may otherwise store the seven unique zadhoff chu sequences and the predetermined duration over which signals will be modulated with the unique sequences. Based on the predetermined duration and the calculated interferer distances range, access node 502 may determine a monitoring period to detect unique zadhoff chu sequences. Based on the monitoring, access node 502 may receive and demodulate interference signals from one or more of access nodes 506. The received interference signals may be demodulated such that the zadhoff chu sequences applied to the interference signals at transmission may be determined. The determined zadhoff chu sequences may then be compared to the unique zadhoff chu sequences assigned to each potential interfering access node to determine which of access nodes 506 is causing interference at access node 502.

At step 610, the identified interference sources may be instructed to adjust transmissions based on the monitored interference. For example, based on the analyzed interference experienced at access node 502, one or more interference sources may be identified. When neighboring wireless devices are determined to be causing interference, the frequency bands that experienced interference (e.g., subcarriers) may be used to identify potential interfering wireless devices, and the identified wireless devices may be instructed to reduce transmission power.

When access nodes are determined to be causing interference, one or more access nodes may be identified as interference sources, and the one or more access nodes may be instructed to reduce transmission power and/or adjust transmission scheduling. In an embodiment, the identified one or more interfering access nodes (e.g., one or more of access node 506) may then be instructed to adjust their transmissions by adjusting their transmission schedule, adjusting their transmission power, adjusting weights used by a plurality of antennas to transmit signals (i.e., in a MIMO configuration), or by any other suitable manner.

In an embodiment, identification of TOF interference sources may experience include additional complexities. For example, a partially received symbol (e.g., OFDM symbol) may be received at access node 502 as interference, and inference source identification may be reliant upon the partially received symbol. However, Zadoff chu sequences are often selected such that they span the entire length of a symbol (e.g., OFDM symbol) in the time domain. Accordingly, systems and methods that allow for interference source detection based on partially received symbols may provide robust interference mitigation functionality.

Figure 8:
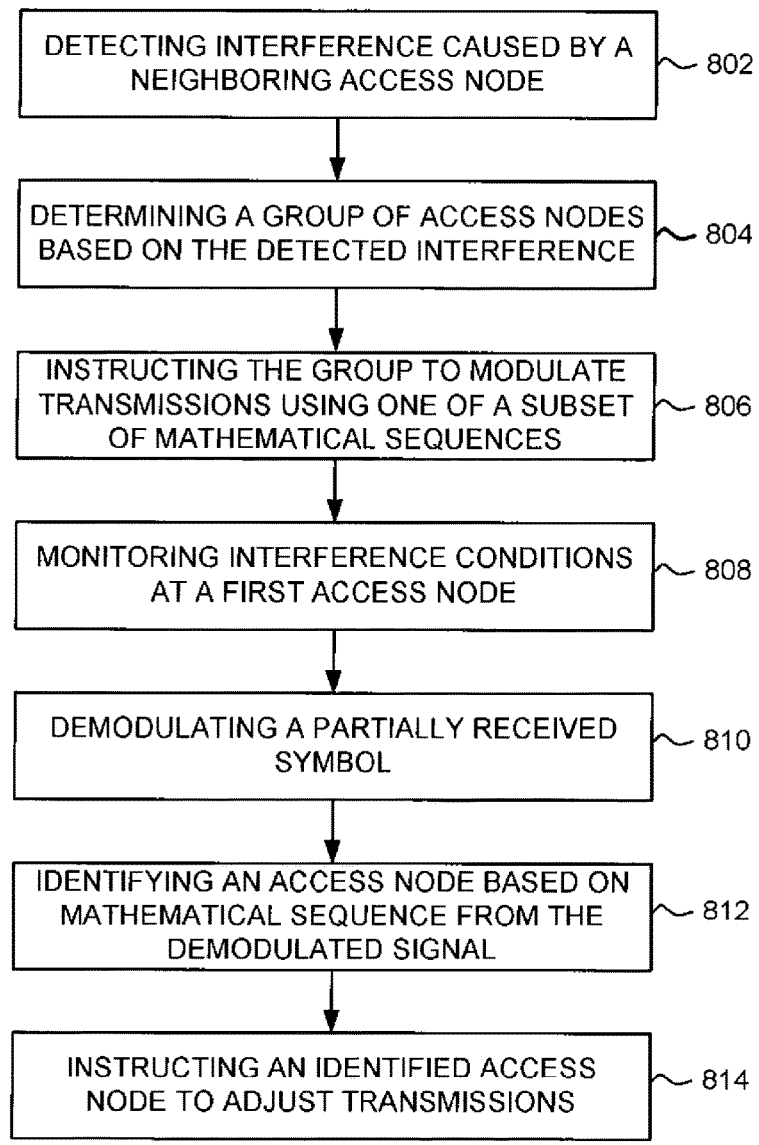
FIG. 8 illustrates another exemplary method for mitigating interference from neighbors.

FIG. 8 illustrates an exemplary method for mitigating interference from neighbors. The method will be discussed with reference to the exemplary communication system 500 illustrated in FIG. 5, however, the method can be implemented with any suitable communication system.

Referring to FIG. 8, at step 802, interference caused by a neighboring access node may be detected at a first access node. In an embodiment, access node 502 may implement a TDD communication scheme, and one or more subframes may be monitored at access node 502. During the monitoring, interference may be detected.

In an embodiment, the interference detection may be similar to steps 602-608 of FIG. 6. For example, interference conditions may be monitored at access node 502 over a special subframe (e.g., a UpPTS portion of a special subframe) and a following uplink subframe. The interference pattern may be analyzed to determine a source for the interference. In this example, the interference may be identified as TOF interference caused by one or more neighboring access nodes.

In an embodiment, access node 502 may store the timestamps for the interfering signals (e.g., during the UpPTS portion of the special subframe and the uplink subframe) and may also store the end timestamp for the DwPTS portion of the special subframe. Based on the detected interference, an interferer distance range may be calculated, where the value of the range is bound by a calculated guard period distance and a calculated cell distance. The cell distance may be calculated using the equation disclosed herein.

At step 804, a group of access nodes may be determined as potential interferers based on the detected interference at the first access node. In an embodiment, based on the interferer distance range calculated, a group of access nodes may be identified as potential interferes. For example access nodes 506 within geographic region 512 may be within the calculated interferer distance range from access node 502, and accordingly access nodes 506 may be identified as potential interferers.

At step 806, the group of access nodes are instructed to modulate transmission using one of a subset of mathematical sequences, wherein the subset of sequences is received at the first access node. For example, in order to identify which of the potential interferers is causing the interference at access node 502, each access node in the group of potential interferes may be assigned a unique zadoff chu sequence for modulation and may be further instructed to implement the particular zadoff chu sequence over a predetermined duration of time. In this example, seven potential interferers are identified, and accordingly seven unique zadoff chu sequences are assigned to each of access nodes 506. The unique zadoff chu sequences may be received and/or stored at access node 502.

In an embodiment, the subset of sequences may comprise a unique set of zadoff chu sequences that are smaller than the length of a transmitted symbol (e.g., OFDM symbol). For example, often in wireless systems zadoff chu sequences span the length of a transmitted symbol (e.g., OFDM symbol), however this limits the beneficial properties of zadoff chu sequences when only a partial symbol is received at a receiving device or access node. Accordingly, in an embodiment, zadoff chu sequences that are smaller than the length of a transmitted symbol may be used such that partial reception of a transmitted symbol may still yield the beneficial aspects of zadoff chu sequences. Here, the beneficial aspect may be identification of the transmitter (e.g., transmitting access node) of the symbol that has had the zadoff chu sequence applied to it.

Figure 9:
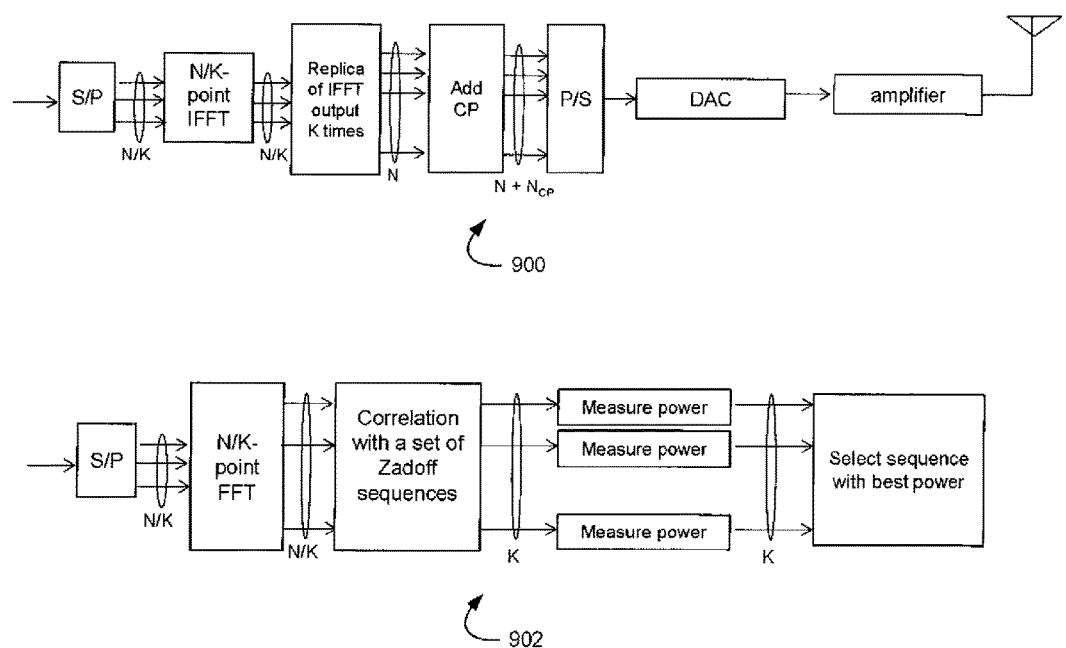
FIG. 9 illustrates exemplary transmission and reception apparatuses to mitigate interference from neighbors.

In an embodiment, a zadoff chu sequence may be a fraction of the size of the transmitted symbol, and the fractional zadoff chu sequence may be repeated until it is the size of the transmitted symbol. For example, a zadoff chu sequences may be ⅕ the size of a transmitted symbol, and the zadoff chu sequence may be repeated 5 times before being applied to the symbol. In other embodiments, any other fraction and corresponding repetition may be implemented. FIG. 9 illustrates devices for transmitting and receiving a symbol in accordance with an embodiment. Device 900 illustrates a device for transmitting a symbol (e.g., OFDM symbol) that has had a repeated zadoff chu sequence, as described above, applied to the symbol prior to transmission. In the illustrated example, a symbol is of size K, and N zadoff chu sequences are repeated such that the aggregate is of size K.

Figure 10A:
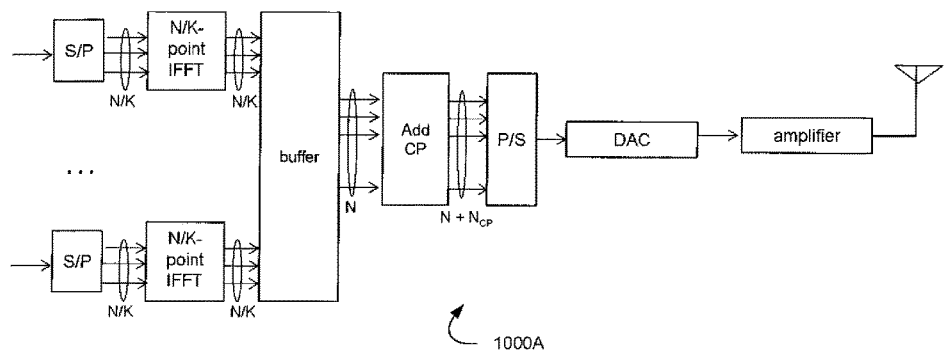
FIGS. 10A-10B illustrate exemplary transmission and reception apparatuses to mitigate interference from neighbors.

In an embodiment, a zadoff chu sequence may be a fraction of the size of the transmitted symbol, and a plurality of different fractional zadoff chu sequence may be appended together until the aggregate is the size of the transmitted symbol. For example, a zadoff chu sequences may be ⅕ the size of a transmitted symbol, and 5 different fractional zadoff chu sequences may be appended together to generate an aggregated zadoff chu sequences before being applied to the symbol. In other embodiments, any other fraction and corresponding number of appended zadoff chu sequences may be implemented. FIG. 10A illustrates a device for transmitting a symbol in accordance with an embodiment. Device 1000A illustrates a device for transmitting a symbol (e.g., OFDM symbol) that has had a sequence comprising a plurality of different zadoff chu sequences, as described above, applied to the symbol prior to transmission. In the illustrated example, a symbol is of size K, and N different zadoff chu sequences are appended such that the aggregate is of size K.

Figure 11:
FIG. 11 illustrates an exemplary hopping algorithm for generating a mathematical sequence.

In an embodiment, the different fractional zadoff chu sequences may be appended based on a hopping sequence. FIG. 11 illustrates a hopping algorithm for generating a mathematical sequence according to an embodiment. In the illustrated example 1100, the Y axis may illustrate each different fractional zadoff chu sequence while the x axis may indicate the number of zadoff chu sequences that comprise the aggregated sequence. The different fractional zadoff chu sequences may comprise a particular and predetermined order, as illustrated, and generation of the aggregate sequence may include appending the fractional zadoff chu sequences in order based on the illustrated hopping algorithm. Accordingly, using the predetermined order and the known hopping algorithm, the transmitter of a received symbol may be identified based on the order for the appended fractional zadoff chu sequences.

In an embodiment, the hopping sequence for the m-th signal may be represented by the equation:

$$X_m = [X_{mod(m,N/k)}, X_{mod(m+1,N/k)}, \cdots, X_{mod(m+k+1,N/k)}]$$

The algorithm of FIG. 11 illustrates a hopping sequences where m=3. In this example $X_m$ comprises a 1×N vector for the m-th signal, in which the $X_{mod(m,N/k)}$ comprise 1×K vectors that represent the fractional zadoff chu sequences. For example, a conventional zadoff chu sequences can be defined by the equation:

$$Xu(n) = e^{-j\frac{\pi un(n+1+2q)}{N_{ZC}}}$$

In examples that implement fractional zadoff chu sequences, the equation can be altered where $N_{ZC}$, the length of the zadoff chu sequence, is replaced by k, the length of the fractional zadoff chu sequence:

$$Xu(n) = e^{-j\frac{\pi un(n+1+2q)}{k}}$$

At step 808, interferences signals received at the first access node may be monitored, wherein at least one partial symbol is received. For example, interference may be monitored at access node 502 over a predetermined period of time or a predetermined number of subframes. The interference may be caused by transmissions from neighboring access nodes 506, identified as potential interferers. In this example, the interference experienced at access node 502 may be monitored after the identified potential interferers 506 are instructed to modulate symbols using assigned mathematical sequences.

In an embodiment, the interference may comprise at least a partially received symbol at access node 502. For example, because the potential interferers are a distance away from access node 502, the interference experienced may be inconsistent, and therefore a complete symbol may not be received at access node 502. Accordingly, a partial symbol may be received at access node 502 as part of the experienced interference.

At step 810, the partially received symbol may be demodulated. For example, the partially received symbol may be demodulated such that a mathematical sequences applied to the partially received symbol may be determined. As described herein, potential interferes 506 may be instructed to apply unique zadoff chu sequences to transmitted symbols. In an embodiment where the unique zadoff chu sequence comprises a repetition of a fractional zadoff chu sequence, as described herein, a receiving apparatus as illustrated FIG. 9 may be implemented. For example, receiving apparatus 902 may be used to demodulate the partially received symbol such that the zadoff chu sequences applied to the symbol may be determined. As illustrated, a received signal may be transformed from serial to parallel, and a mathematical function, such as a fast Fourier transform, may be applied. Power levels for the different signal components may be measured to determine the sequence that corresponds to the signal component with the highest measured power. The determined sequence may be identified as a zadoff chu sequence that was applied to the partially received symbol.

Figure 10B:
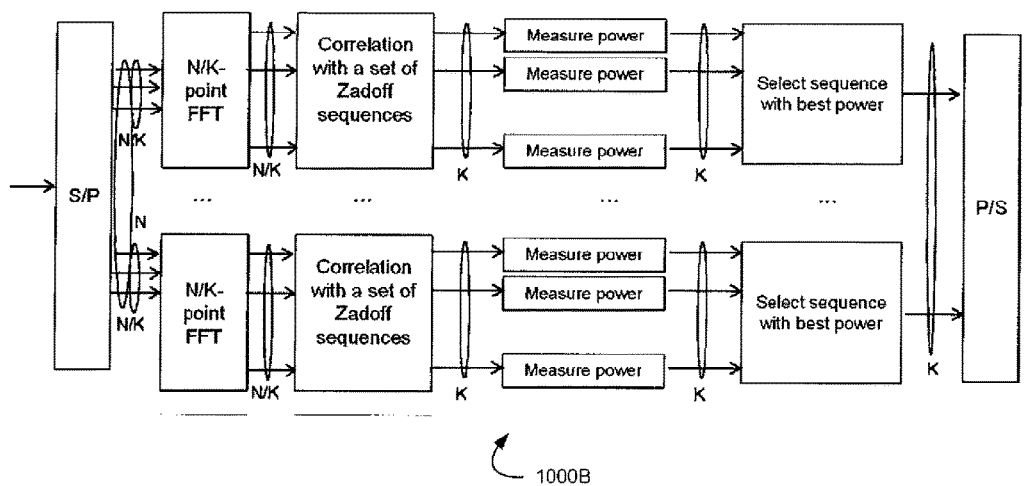

In another embodiment where the unique zadoff chu sequence comprises a plurality of different fractional zadoff chu sequences appended together, as described herein, a receiving apparatus as illustrated FIG. 10B may be implemented. For example, receiving apparatus 1000B may be used to demodulate the partially received symbol such that the zadoff chu sequences applied to the symbol may be determined. As illustrated, a plurality of received signals may be transformed from serial to parallel, and a mathematical function, such as a fast Fourier transform, may be applied. For each received signal, power levels for different signal components of each received signal may be measured to determine the sequences that correspond to the signal component with the highest measured power. The determined sequences for each received signal may be identified as one of the zadoff chu sequences that was applied to the partially received symbol. These identified zadoff chu sequences may then be analyzed based on the predetermined order for zadoff chu sequences assigned to the potential interferers and the hopping algorithm, as described herein.

At step 812, the access node that transmitted the partially received symbol may be identified based on the subset of mathematical sequences. For example, where the unique zadoff chu sequences applied to transmitted symbols by the potential interferes comprise a repetition of fractional zadoff chu sequences, the determined zadoff chu sequence that corresponds to the signal component with the highest measured power may be identified as the zadoff chu sequences assigned to the interfering access node. The access node assigned the identified zadoff chu sequence may be determined based on the subset of known zadoff chu sequences assigned to potential interferes. Accordingly, the interfering access node may be identified.

In an embodiment where the unique zadoff chu sequences applied to transmitted symbols by the potential interferes comprises a plurality of different fractional zadoff chu sequences appended together, the identified zadoff chu sequences corresponding to the signal components with the highest measured powers may be analyzed based on the predetermined order for zadoff chu sequences assigned to the potential interferers and the hopping algorithm. For example, the pattern of zadoff chu sequences corresponding to interference received at access node 502 may be compared to the zadoff chu sequences assigned to the potential interferes. An interfering access node may be identified when at least a portion of the zadoff chu sequence assigned to the access node matches the pattern of zadoff chu sequences. For instance, based on a predetermined order of fractional zadoff chu sequences and the hopping algorithm, as described herein, generated sequences comprising an aggregate of fractional zadoff chu sequences may be assigned to the potential interferes. When the pattern of zadoff chu sequences from the interference received at access node 502 matches a portion of a generated sequences of aggregated fractional zadoff chu sequences assigned to one of the potential interferes, the access node assigned the matching sequence may be identified as the interfering access node. In an embodiment, in order for the interfering access node to be identified, the matching portion may be at least a threshold number of fractional zadoff chu sequences or some other threshold size.

In an embodiment where the unique zadoff chu sequences applied to transmitted symbols by the potential interferes comprises a plurality of different fractional zadoff chu sequences appended together, a pattern detection algorithm may be used to identify patterns that may match a zadoff chu sequence assigned to a potential interferer. For example, a pattern of a plurality of zadoff chu sequences corresponding to signals (e.g., interference) received at access node 502 may be determined. The pattern may be compared to zadoff chu sequences assigned to the potential interferes to determine whether there is a match between the pattern and a portion of the assigned sequences. The comparison may be performed based on the predetermined order of zadoff chu sequences and the hopping algorithm, as previously described. Based on the technique used to generate the assigned sequences, it may be determined whether the pattern partially matches a portion of an assigned sequence.

In an embodiment, the characters D A J I P may represent a pattern of sequences received as interference. The pattern, or a subset of the pattern comprising a predetermined number of sequences, may be compared to the predetermined assigned sequences. Where a match is found, the match may be used to identify the interfering access node (e.g., the access node assigned the matching sequence). Where a match is not found, the pattern of sequences may be trimmed, or the subset of the pattern of sequences may be trimmed. For example, the D may be trimmed from the pattern to leave A J I P. The trimmed pattern may then be compared to determine a potential match with the assigned sequences. This process may be repeated until a match is found and an interfering access node is identified.

At step 814, the identified interfering access node may be instructed to adjust transmissions. For example, the interfering access node may be instructed to reduce transmission power for transmission for the access node. In an embodiment, the interfering access node may be instructed to reduce transmission power for a subset of subframes (e.g., corresponding to the detected interference), on a subset of frequency bands, or in any other suitable manner. In another embodiment, the identified interfering access node may implement a multiple input multiple output (MIMO) antenna configuration, and one or more weights for the antennas may be adjusted.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 12:
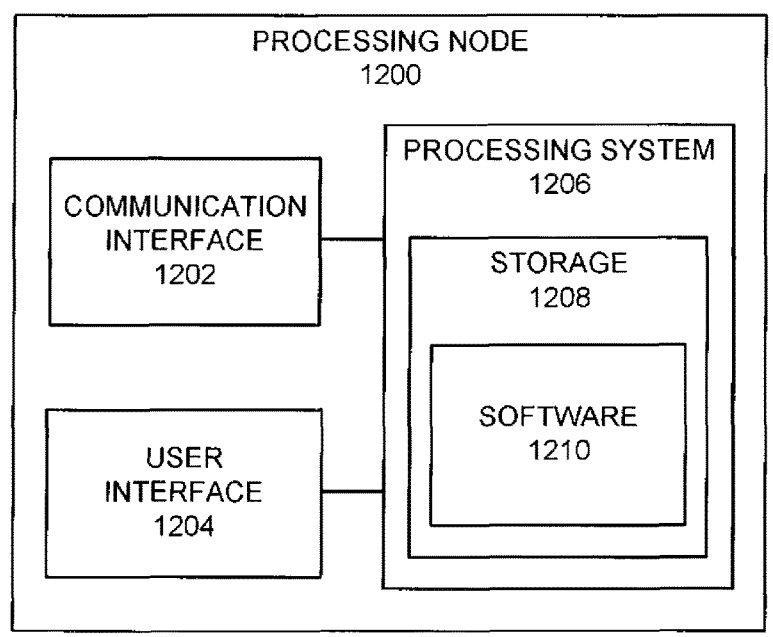
FIG. 12 illustrates an exemplary processing node.

FIG. 12 illustrates an exemplary processing node 1200 in a communication system. Processing node 1200 comprises communication interface 1202, user interface 1204, and processing system 1206 in communication with communication interface 1202 and user interface 1204. Processing node 1200 can be configured to determine a communication access node for a wireless device. Processing system 1206 includes storage 1208, which can comprise a disk drive, flash drive, memory circuitry, or other memory device. Storage 1208 can store software 1210 which is used in the operation of the processing node 1200. Storage 1208 may include a disk drive, flash drive, data storage circuitry, or some other memory apparatus. Software 1210 may include computer programs, firmware, or some other form of machine-readable instructions, including an operating system, utilities, drivers, network interfaces, applications, or some other type of software. Processing system 1206 may include a microprocessor and other circuitry to retrieve and execute software 1210 from storage 1208. Processing node 1200 may further include other components such as a power management unit, a control interface unit, etc., which are omitted for clarity. Communication interface 1202 permits processing node 1200 to communicate with other network elements. User interface 1204 permits the configuration and control of the operation of processing node 1200.

Examples of processing node 1200 include controller node 410 and gateway node 412. Processing node 1200 can also be an adjunct or component of a network element, such as an element of access nodes 108 or 406 and the like. Processing node 1200 can also be another network element in a communication system. Further, the functionality of processing node 1200 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for mitigating interference from neighbors, the method comprising:
    scheduling, at a first access node, at least two monitored subframes, the at least two monitored subframes being structured to identify an interference pattern;
    monitoring interference at the first access node, wherein the monitoring includes detecting the interference pattern over the at least two monitored subframes;
    analyzing the interference pattern to identify one or more interference sources, wherein a first interference pattern indicates interference caused by a neighboring access node and a second interference pattern indicates interference caused by one or more wireless devices communicating with a neighboring access node; and
    instructing the one or more identified interference sources to adjust transmissions based on the monitored interference.

2. The method of claim 1, wherein scheduling, at the first access node, the at least two monitored subframes comprises:
    scheduling, at the first access node, a special subframe followed by an uplink subframe during the monitored subframes, wherein the special subframe comprises a downlink pilot time slot, a guard period, and an uplink pilot time slot.

3. The method of claim 2, wherein the group of neighboring access nodes comprises access nodes from the first access node's neighbor relations list, a super set of access nodes from the first access node's neighbor relations list, access node from a paging group for the first access node.

4. The method of claim 2, wherein the first interference pattern comprises interference detected during the uplink pilot time slot of the special subframe.

5. The method of claim 4, wherein the first interference pattern further comprises interference detected during the uplink subframe such that the interference energy for the interference detected during the uplink subframe is below a threshold interference energy.

6. The method of claim 4, wherein the first interference pattern further comprises interference detected during the uplink subframe such that the interference is detected over a first half of time slots for the uplink subframe.

7. The method of claim 2, wherein the second interference pattern comprises interference detected during the uplink subframe.

8. The method of claim 7, wherein interference energy for the interference detected during the uplink subframe is above a threshold interference energy.

9. The method of claim 7, wherein the interference over the uplink subframe is detected over a threshold number of time slots for the uplink subframe.

10. A system for mitigating interference from neighbors, the system comprising:
    a first access node comprising a processor and a management node comprising a processor, wherein at least one of the first access node and management node is configured to:
    schedule, at the first access node, at least two monitored subframes, the at least two monitored subframes being structured to identify an interference pattern;
    monitor interference at the first access node, wherein the monitoring includes detecting the interference pattern over the at least two monitored subframes;
    analyze the interference pattern to identify one or more interference sources, wherein a first interference pattern indicates interference caused by a neighboring access node and a second interference pattern indicates interference caused by one or more wireless devices communicating with a neighboring access node; and
    instruct the one or more identified interference sources to adjust transmissions based on the monitored interference.

* * * * *